March 25, 1969     H. F. MOSIER, JR     3,434,205
METHOD OF MAKING ELECTROACOUSTICAL DEVICES
Filed June 24, 1966

INVENTOR
HAROLD F. MOSIER, JR.
BY
ATTORNEYS

United States Patent Office 3,434,205
Patented Mar. 25, 1969

3,434,205
**METHOD OF MAKING ELECTRO-
ACOUSTICAL DEVICES**
Harold F. Mosier, Jr., Buchanan, Mich., assignor, by mesne assignments, to Electro-Voice, Incorporated, Buchanan, Mich., a corporation of Delaware
Continuation-in-part of application Ser. No. 227,498, Oct. 1, 1962. This application June 24, 1966, Ser. No. 564,481
Int. Cl. H04r *31/00;* G10k *13/00*
U.S. Cl. 29—594    14 Claims

ABSTRACT OF THE DISCLOSURE

Methods of making electroacoustical devices by molding the elements in position are disclosed. In one embodiment, a magnetic gap for a voice coil is achieved by molding a cylindrical core within a circular opening of a pole piece. In the same process, a rim is molded on the pole piece for positioning a diaphragm. The cylindrical core in one embodiment is a permanent magnet, and in another embodiment is itself a pole piece. In still another embodiment of the invention two piezoelectric elements for use in a stereophonic phonograph pickup are molded together at opposite ends to provide a single assembly of backpad, piezoelectric elements and yoke. This assembly is positionable in a casing and secured in position by a snap-on cover. The stylus drive arm is also snapped into position by a snap-in clip.

---

This patent is a continuation-in-part of U.S. Patent No. 3,258,543 of the present inventor entitled "Dynamic Microphone," granted June 28, 1966, and filed Oct. 1, 1962, Ser. No. 227,498.

The present invention relates to methods for making electroacoustical devices such as microphones, earphones, phonograph pickups, and the like.

Moving coil type microphones and earphones are well known, and the textbook "Acoustical Engineering," by Harry F. Olson, D. Van Nostrand & Co., Inc., Princeton, N.J., 1957, describes and analyzes the operation of such microphones at pages 260 through 263. Such microphones and earphones generally employ a case which has an opening closed by a vibratal diaphragm. The vibratal diaphragm of the microphone or earphone carries a coil which is disposed within a gap in a magnetic circuit. In such a microphone, movement of the diaphragm, and hence the coil, referred to as a voice coil, generates an electric current in the voice coil, since it is cutting magnetic lines of force. In such an earphone, an alternating electric current flowing through the coil vibrates the diaphragm.

Since the magnitude of the current generated in the voice coil of a microphone responsive to vibration of the diaphragm is proportional to the flux density in the magnetic gap, the magnetic gap is made as small as practical, and the voice coil is carefully centered in the magnetic gap. The same considerations also apply to construction of earphones. It is one of the objects of the present invention to provide an improved method for manufacturing such microphones and earphones.

The present invention also has utility for manufacturing phonograph pickups of both the monaural type and stereophonic type. Since it is of particular advantage in a stereophonic phonograph pickup, it will be illustrated in this form.

One type of stereophonic phonograph pickup employed prior to the present invention utilizes a pair of bender type piezoelectric elongated elements which are mounted with their axes of elongation generally parallel to each other on a compliant backpad which positions the elements relative to a casing, the elements being disposed within an elongated cavity within the casing. The end of the piezoelectric elements opposite the backpad are mounted in a Y-shaped yoke, one element being affixed to the end of one of the legs of the yoke and the other element being affixed to the end of the other leg of the yoke. The junction portion of the yoke passes through an opening in the casing of the phonograph pickup and engages a stylus drive arm which is mounted at one end of the exterior surface of the casing and carries a stylus at its opposite end. The patent application of Durbin and Wood, Ser. No. 736,819, filed May 12, 1958, now abandoned, illustrates such a phonograph pickup.

Phonograph pickups constructed in the manner described above have been highly successful. It is an object of the present invention to provide a method of making a phonograph pickup which may be applied to stereophonic phonograph pickups of the type described above and which will result in a lower manufacturing cost.

As in all manufacturing, stereophonic phonograph pickups of the type described above have resulted in production rejects. It is an object of the present invention to provide a method of making a phonograph pickup which reduces the relative number of production rejects. One of the causes for production rejects of stereophonic phonograph pickups of the type described above is scraping of the movable portions of the ceramic elements or the yoke against the casing of the pickup caused by improper location of the yoke or backpad relative to the ceramic elements or relative to the casing. It is an object of the present invention to provide a method of making phonograph pickups which substantially eliminate production rejects for this cause.

Piezoelectric ceramic elements are fragile, and a substantial number of piezoelectric elements have been broken in the process of installing yokes and backpads on the elements. It is a further object of the present invention to provide a method of manufacture which substantially eliminates breakage of piezoelectric ceramic elements from these causes.

Further, it is an object of the present invention to provide a method for manufacturing a sub-assembly of piezoelectric elements, backpad, and yoke in which the backpad and yoke may be simultaneously mounted and affixed to the piezoelectric elements.

It is a further object of the present invention to provide a method of making electroacoustical devices which simplifies assembly techniques, reduces costs, and increases reliability, particularly reducing the number of rejected units due to inadequate clearance of parts, improper positioning of parts, and the like.

Further objects of the present invention will become apparent from a further consideration of this specification, particularly when viewed in the light of the drawings, in which:

In the embodiment illustrated in FIGURES 1 through 5, the microphone structure has a diaphragm 10, which is mounted on a supporting ring 12 and carries a voice coil 14. The supporting ring 12 also mounts a cylindrical magnet 16 and a U-shaped magnetic pole piece 18. In addition, a pair of lugs 20 are supported on the surface of the supporting ring 12 opposite the diaphragm 10.

Referring to FIGURES 2 through 5, it will be seen that the supporting ring 12 has a ferromagnetic part 22 and a nonmagnetic part 24. The ferromagnetic part 22 is in the form of a circular disc, or plate, except for an indentation 26 at its periphery. The ferromagnetic part or disc 22 has a central cylindrical opening 28 for accommodating the magnet 16, and a plurality of apertures 30 disposed at the same distance from the center of the ferromagnetic disc 22 and spaced at equal intervals about the periphery of the disc, although it is not required that the apertures be equally spaced or at a common distance from the center.

Figure 4:
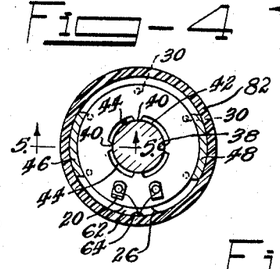
FIGURE 4 is a sectional view of the microphone taken along the line 4—4 of FIGURE 3.
Figure 5:
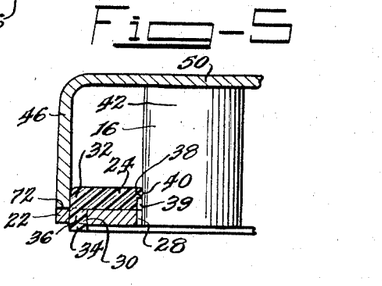
FIGURE 5 is a fragmentary sectional view of the microphone taken along the line 5—5 of FIGURE 4, the external casing being omitted.

The nonmagnetic part 24 has a disc portion 32 disposed on one side of the ferromagnetic part or disc 22 and a ring portion 34 disposed on the other side of the disc 22. The disc portion 32 and the ring portion 34 are interconnected by rod portions 36 which extend through the apertures 30, and the disc portion 32, ring portion 34 and rod portions 35 are preferably constructed of an integral mass of the same material, such as plastic. The disc portion 32 of the nonmagnetic part 24 is also provided with a central cylindrical opening 38 which is coaxial with the opening 28 in the ferromagnetic part or disc of the supporting ring 12. The diameter of the opening 38 is equal to the outer diameter of the magnet 16, but the disc portion 32 is provided with a coaxial recess 39 and a plurality of slots 44 which extend from the recess 39 parallel to the axis of the magnet 16, thus forming ribs 40. The magnet 16 is in abutment with the ribs 40 of the opening 38 and the cylindrical surface 42 of the magnet 16 and slots 44, thereby forming arcuate spaced passages from the surface of the recess 39 through the disc portion 32, as illustrated in FIGURE 4. In the particular construction here described, the passages formed by the slots 44 are equally spaced about the opening 38 forming four slots 44, although it is to be understood that the slots 44 need not be equally spaced and may be more or fewer in number.

The ribs 40 have the double function of securing and centering the magnet 16 on the supporting ring 12 and providing the proper clearance for the slots 44. The slots 44 provide a resistance and an inductive component for damping the diaphragm, as will be hereinafter explained.

The magnet 16 extends from the supporting ring 12 to the pole piece 18. The pole piece 18 has a pair of legs 46 and 48 which extend from a crossmember 50, the crossmember 50 abutting the end of the magnet 16 opposite the supporting ring 12. The legs 46 and 48 extend into abutment with the ferromagnetic disc 22 which has a diameter greater than the diameter of the disc portion 32 of the nonmagnetic part 24 of the supporting ring 12. The legs 46 and 48 abut the edges of the disc portion 32 and abut the ferromagnetic disc 22 at their ends. The magnet 16 extends into the opening 28 in the ferromagnetic disc 22 thus forming a circular gap 52 between the magnet surface 42 and the confronting opening 28 of the ferromagnetic disc 22. The voice coil 14 is translatably disposed within this gap 52 along the axis of the magnet 16. The magnetic circuit includes the magnet 16, the crossmmeber 50, legs 46 and 48, ferromagnetic disc 22, and the gap 52.

The diaphragm 10 has a circular perimeter with a diameter equal to the inner diameter of the ring portion 34 of the supporting ring 12. The diaphragm 10 has a flat ring-shaped peripheral portion 54 which is cemented on the confronting surface of the ferromagnetic disc 22, and is centered coaxially about the central axis of the openings 28 and 38 by the inner perimeter of the ring portion 34 of the supporting ring 12. The diaphragm 10 has a plurality of flutes 56 disposed in a circular band coaxially within a circular flange portion 57 which extends from the peripheral flat portion 54. The band of flutes 56 and flange portion 57 space a circular central portion 58 of the diaphragm from the ferromagnetic disc 22. The circular central portion 58 of the diaphragm 10 is in the form of a dome protruding outwardly from the ferromagnetic disc 22, and the portion of the diaphragm within the circular flange portion 57, including the domed central portion 58 and flutes 56, is free to vibrate relative to the disc 22. The coil 14 also is circular in form and mounted on the surface of the diaphragm 10 confronting the ferromagnetic disc 22. The coil 14 has a diameter selected to permit it to be freely translated within the gap 52. The coil 14 is cemented onto the diaphragm 10 about the perimeter of the domed central portion 58 thereof, and the ends of the coil 14 are brought out through apertures 60 in the diaphragm 10 at the interface between the domed central portion 58 and the portion having the flutes 56.

The nonmagnetic part 24 of the supporting ring 12 has a flange 62 which fills the identation 26 of the ferromagnetic part 22, thereby providing a completely circular periphery to the supporting ring 12. A groove 64 normal to the surface of the ferromagnetic disc 22 is disposed centrally of the flange 62 to permit the ends of the coil 14 to traverse from the face of the diaphragm 10 to the lugs 20 mounted on the nonmagnetic part 24 of the supporting ring 12 on the side of the ferromagnetic disc 22 opposite the diaphragm 10. The ring portion 34 of the supporting ring 12 is also provided with a gap 68 for the ends of the coil 14.

In the manufacture of a microphone structure as described in FIGURES 1 through 5, the nonmagnetic part 24 of the supporting ring 12 is molded as a unit on the ferromagnetic part 22 thereof, the ring portion 34, rod portions 36, and disc portion 32 being molded in a single operation. This same molding operation forms the ribs 40 on the opening 38. The microphone structure is assembled by inserting the cylindrical magnet into the opening 38 and the opening 28, and thereafter mounting the pole piece 18 in position. A layer of cement 70 may be disposed between the pole piece 18 and the end of the magnet 16, and cement layers 72 and 74 may be disposed between the ends of the legs 46 and 48 of the pole piece 18 and the ferromagnetic disc 22.

The voice coil 14 is cemented on the surface of the diaphragm 10 prior to assembly, and thereafter the diaphragm 10 is trimmed, or cut, to have an outer diameter approximately equal to the inner diameter of the ring portion 34 of the supporting ring 12 prior to assembly and coaxial with the coil. Thereafter, it is only necessary to cement the flat peripheral portion 54 of the diaphragm on the surface of the ferromagnetic disc 22 within the ring portion 34 of the supporting ring 12 to automatically center the voice coil 14 in the gap 52.

Figures 6, 7:
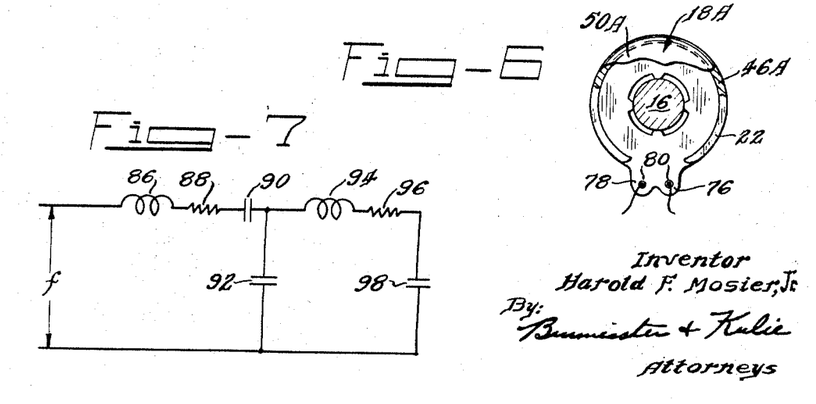
FIGURE 6 is a rear elevational view (partly broken away and in section) of a modified microphone construction according to the present invention.
FIGURE 7 is a schematic electrical circuit diagram illustrating the mechanical network which constitutes the microphone structure in electrical symbols.

In the construction of FIGURES 1 through 5, the pole piece 18 is in the form of a U-shaped strip having legs 46 and 48 and a crossmember 50. In the construction of FIGURE 6, the pole piece 18A is in the form of a ferromagnetic cup in which a cylindrical portion 46A replaces the legs 46 and 48, and a flat bottom 50A replaces the crossmember 50 of the first embodiment. Further, the flange 62 is provided with a pair of outwardly extending tabs 76 and 78 which carry a pair of lugs 80 which replace the lugs 20 of the prior construction. In other respects, the embodiment of the invention illustrated in FIGURE 6 is the same as that illustrated in FIGURES 1 through 5.

Figure 3:
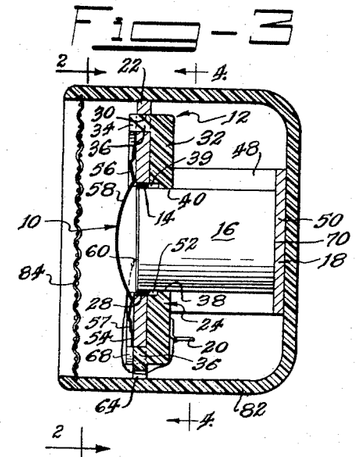
FIGURE 3 is a sectional view of the microphone structure taken along the line 3—3 of FIGURE 2.

It is of course intended that the microphone structures here set forth shall be used in combination with a casing, designated 82 in FIGURES 3 and 4, and a wind screen 84 to form a complete microphone. Depending upon the type of microphone desired, the casing and wind screen may include other acoustical or mechanical elements.

FIGURE 7 illustrates in electrical symbols the mechanical circuit employed by the microphone structure. The acoustical force impressed upon the diaphragm 10 is indicated by the letter "$f$." The inductance 86 represents the mass of the moving system of the microphone, the resistance symbol 88 represents the mechanical resistance of the moving system, and the capacitor symbol 90 represents the compliance of the diaphragm and suspension of the microphone structure. The capacitor 92 represents the compliance of the chamber between the ferromagnetic disc 22 and the diaphragm. The other three symbols in FIGURE 7 represent the effect produced by the slots 44. More specifically, the inductance symbol 94 represents the equivalent mass of the slots, the resistance 92 represents the acoustical resistance of the slots 44, and the capacitor 98 represents the compliance of the chamber on the side of the supporting ring 12 opposite the diaphragm 10. By proper proprotioning of these elements, the diaphragm may be damped to approach a resistance controlled microphone structure. Since the compliance of the enclosed volume of air within the pole piece 46A or within the casing 82 enters into the damping of the diaphragm, these must be considered in designing the microphone.

In one particular construction, the outer diameter of the diaphragm 10 is approximately 1.06 inches and the diameter of the voice coil 14 is approximately 0.50 inch. The diameter of the opening 38 is approximately 0.58 inch and the inner diameter of the recess 39 is approximately 0.535 inch, the diameter of the arcuate surface of the slots 44 is approximately 0.528 inch, and the gap 52 has a width of approximately 0.0035 inch. The ferromagnetic disc 22 has a thickness of approximately 0.07 inch and is constructed of magnet iron. The ring portion 34 of the supporting ring 12 has an outer diameter of approximately 1.225 inches and an inner diameter of approximately 1.063 inches. The ring portion 34 extends from the ferromagnetic disc 22 a distance of approximately 0.03 inch, and the disc portion 32 has a thickness of approximately 0.108 inch. The material of the nonmagnetic portion 22 of the supporting ring 12 is polyethylene plastic. The diaphragm 10 is also constructed of plastic and may be Mylar.

Figures 8, 9, 10, 11, 12:
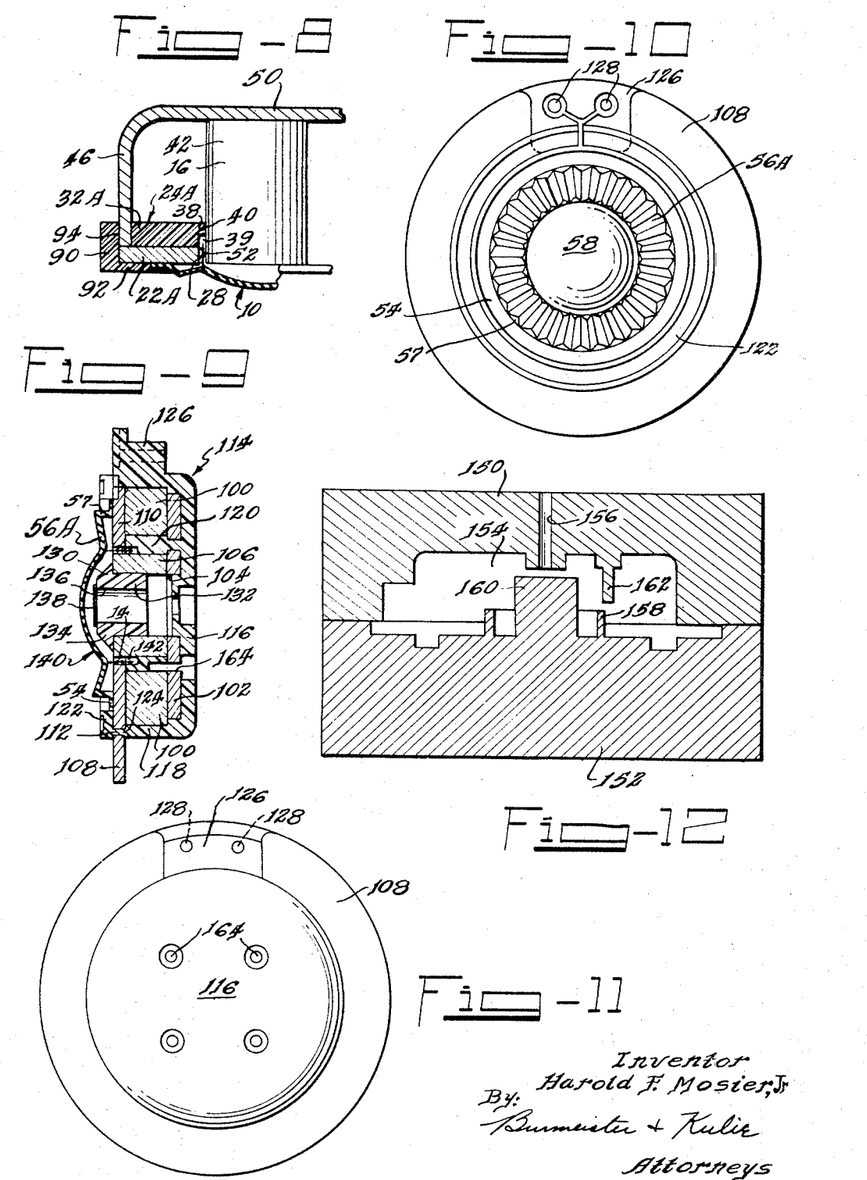
FIGURE 8 is a fragmentary sectional view of another embodiment of the present invention taken on a plane similar to that of FIGURE 5.
FIGURE 9 is a vertical sectional view of an earphone constructed according to the teachings of the present invention.
FIGURE 10 is a front elevational view of the earphone of FIGURE 9.
FIGURE 11 is a rear elevational view of the earphone of FIGURES 9 and 10.
FIGURE 12 is a vertical sectional view of a mold suitable for manufacturing the earphone of FIGURES 9 through 11.

FIGURE 8 fragmentarily illustrates a dynamic microphone which is a modification of the microphone illustrated in FIGURES 1 through 5. Identical reference numerals have been used in FIGURE 8 for elements which are identical to those in FIGURES 1 through 5. In this embodiment of the invention, the ferromagnetic disc 22A has no apertures, such as the apertures 30 of the disc 22, for accommodating rod portions of the nonmagnetic part, but the disc 22A is in all other respects identical with the disc 22 of the embodiment of FIGURES 1 through 5.

The nonmagnetic part 24A of FIGURE 8 has a disc portion 32A with a larger diameter than the plate or disc 22A. A coaxial circular flange 90 extends from the perimeter of the disc portion 32A about the perimeter of the disc 22A, and a flat ring portion 92 extends from the flange 90 inwardly and in parallel abutment with the surface of the plate 22A opposite the disc portion 32A of the nonmagneitc part 24A. In this manner, the disc or plate 22A is clamped between the disc portion 32A of the nonmagnetic portion 24A and the ring portion 92. The inner periphery of the ring portion 92 is a cylindrical surface symmetrically disposed about the gap 52, and the outer perimeter of the diaphragm 10 abuts this surface and is cemented on the surface of the disc 22A in the manner of the embodiment of FIGURES 1 through 5.

It is to be noted that a pair of apertures 94 extend through the disc portion 32A of the nonmagnetic part to accommodate the legs 46 of the pole piece in order to permit the legs to abut the disc of plate 22A and complete the magnetic circuit. Also, the nonmagnetic part may be plastic, as in the previous embodiments, and the nonmagnetic part may be molded on the magnetic part, as previously described.

FIGURES 9, 10, and 11 illustrate an earphone constructed according to the present invention. As illustrated, the earphone is intended to be positioned within a casing, but it is to be understood that the illustrated earphone is fully operative. As illustrated in the figures, a ring magnet 100 is disposed in abutment with a ferromagnetic disc 102 which has a circular central aperture 104 therein. A cylindrical pole piece 106 of ferromagnetic material is disposed coaxially within the ring magnet 100, and a generally circular ferromagnetic plate 108 is mounted adjacent to the end of the pole piece 106 opposite the disc 102. The plate 108 has a plurality of apertures 112 therethrough disposed along a circular path coaxially disposed about the opening 110 in the plate 108.

The entire assembly of magnet 100, disc 102, pole piece 106, and the plate 108 are held together in a unitary assembly by a casing 114 of plastic material, such as nylon. The casing 114 has a flat bottom 116 disposed in abutment with the disc 102, a cylindrical wall 118 extending from the flat bottom in abutment with the exterior surface of the ring magnet 100, and a cylindrical sleeve 120 disposed between the ring magnet 100 and the pole piece 106 abutting these elements to form a spacer member therebetween. In addition, the casing has a ring portion 122 disposed in abutment with the surface of the plate 108 opposite the ring magnet 100 and coaxial with the ring magnet 100. The ring portion 122 is connected to the other portions of the casing by posts 124 to form an integral plastic body. The plate 108 has a recess at the periphery thereof, and this recess contains a protrusion 126 of the casing, and two terminal lugs 128 are embedded within the protrusion of the casing 114.

A damping plug 130 is mounted within the inner cylindrical surface of the pole piece 106 and has a hollow sleeve 132 which abuts the pole piece 106 and may be cemented thereto. The plug 130 also has a cap 134 with an opening 136, and the opening 136 is covered by a layer of cloth 138.

A diaphragm 140 with a circular perimeter of approximately the same diameter as the inner diameter of the ring portion 122 of the casing 114 is mounted within the ring portion 122 on the plate 108. The diaphragm is similar in construction to the diaphragm 10 previously described, and has a peripheral portion 54, a flange 57, and a dome 58, but the fluted portion 56A between the dome 58 and the flange 57 has flutes disposed along radii of the diaphragm 140. In the embodiment of FIGURES 1 through 5, the flutes are disposed on axes tangential to the voice coil 14. In the construction of FIGURES 1 through 5 the flutes provide additional compliance to the diaphragm 10, which is desirable for a microphone application. The flutes of the diaphragm 140 form stiffening ribs and reduce the compliance of this diaphragm, which is desirable in an earphone construction.

It is to be noted that the voice coil 14 is also mounted on the diaphragm 140 in an identical manner to that illustrated in FIGURES 1 through 5 and disposed in a magnetic gap formed between the pole piece 106 and the plate 108. Also, the sleeve 120 of the casing 114 has a circular recess 142 extending from the plate 108 to provide adequate room for translation of the voice coil. The voice coil leads are brought out from the coil 14 between the diaphragm 140 and the plate 108 to the lugs 128 mounted in the protrusion 126.

FIGURE 12 illustrates a cavity mold for injection molding the casing 114 and simultaneously mounting the disc 102, magnet 100, pole piece 106 and plate 108. The mold has an upper part 150 and a lower part 152 which together form a cavity 154 with the contour of the exterior surface of the casing 114. In addition, there is a passage 156 extending through the upper portion of the mold for injection of plastic into the cavity 154. The mold also has a cylindrical sleeve 158 extending upwardly from the lower portion of the mold centrally within the cavity, and a cylindrical boss 160 extending from the lower portion of the mold coaxially within the sleeve 158.

To utilize the mold, the plate 108 is placed against the lower portion of the mold with the opening 110 thereof disposed about the sleeve 158. Also, the pole piece 106 is mounted coaxially between the sleeve 158 and the boss 160 of the lower portion of the mold. Next, the ring magnet 100 and the disc 102 are positioned on the plate 108, and thereafter the upper portion of the mold is closed over the lower portion of the mold.

The upper portion of the mold is provided with four pins 162 which mate with four openings 164 in the disc 102. The pins are positioned to also abut the interior surface of the ring magnet 100. As a result, the pins 162 hold the ring magnet 100 and the disc 102 in a fixed position within the mold. Plastic, in liquid phase, may then be injected into the cavity under pressure through the passage 156 to form the casing 114 when solidified, and simultaneously assemble the magnet 100, disc 102, pole piece 106, and plate 108 in a single operation.

After removing the assembly from the mold, the plug 130 is cemented into the pole piece 106. Thereafter, the assembled diaphragm and voice coil are cemented into place as indicated in connection with the embodiment of FIGURES 1 through 5. The leads from the voice coil are also connected to the terminal plugs 128 before the diaphragm 140 is cemented in position.

Figures 13, 14, 15, 16:
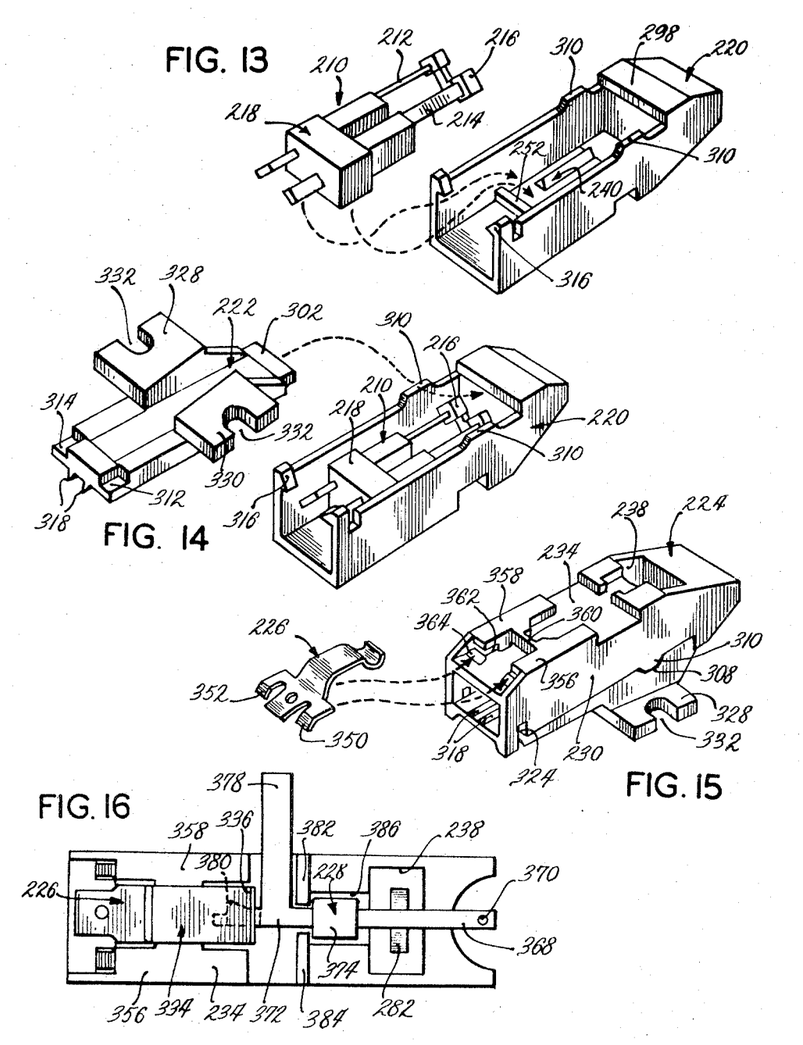
FIGURES 13 through 15 illustrate the assembly of a phonograph pickup constructed according to the teachings of the present invention.
FIGURE 16 is an elevational plan view of the phonograph pickup illustrated in FIGURES 13 through 15.

FIGURES 13 through 15 illustrate the basic steps in assemblying a phonograph cartridge constructed according to the teachings of the present invention. As indicated in FIGURE 13, a generating element assembly 210 which includes two piezoelectric elements 212 and 214 which extend between a yoke 216 and a backpad 218, is positioned in an enclosure body 220. The enclosure body 220 receives the generating element assembly 210 and properly positions the generating element assembly 210 and maintains it in a proper position. As FIGURE 14 illustrates, a cover 222 fits into position on the enclosure body 220 to lock the generating element assembly 210 in position. FIGURE 15 illustrates this stage of the assembly, and also isometrically the exterior surface of the casing 224 formed by the enclosure body 220 and cover 222. In addition, FIGURE 15 illustrates the manner in which the stylus assembly clamp 226 is mounted on the casing 224. FIGURE 16 illustrates the stylus assembly 228 mounted on the casing 224 by means of the clamp 226.

Figure 17:
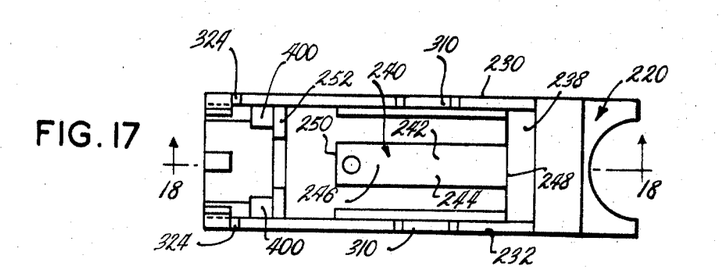
FIGURE 17 is a top elevational view of the enclosing body of the casing of the phonograph pickup illustrated in FIGURES 13 through 16.
Figures 18, 19, 20, 21, 22:
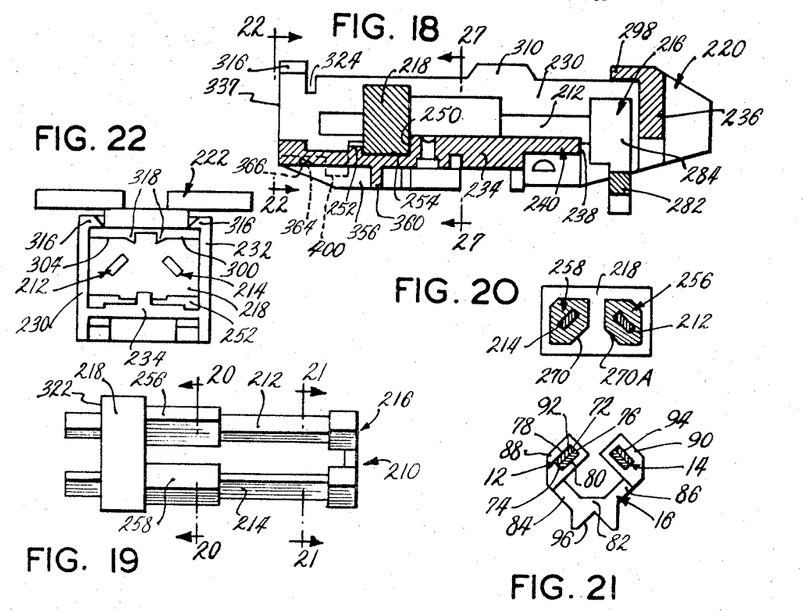
FIGURE 18 is a sectional view taken along the line 18—18 of FIGURE 17 and illustrating the generating elements assembly in position.
FIGURE 19 is a top plan view of the generating element assembly.
FIGURE 20 is a sectional view taken along the line 20—20 of FIGURE 19.
FIGURE 21 is a sectional view taken along the line 21—21 of FIGURE 19.
FIGURE 22 is an end elevational view of the assembled cartridge taken along the line 22—22 of FIGURE 18, the cover of the casing being in position.
Figure 23:
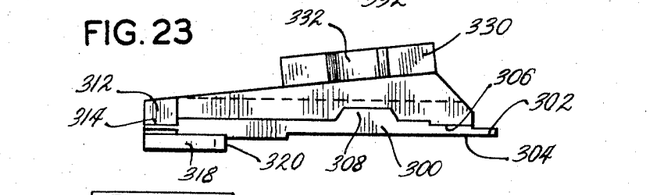
FIGURE 23 is a side elevational view of the cover of the casing.
Figure 24:
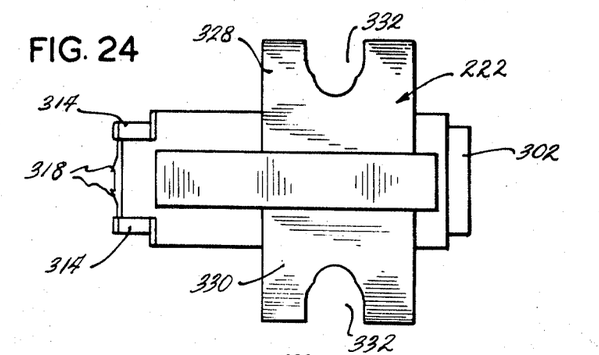
FIGURE 24 is a plan view of the cover of the casing.

FIGURES 17 and 18 illustrate the construction of the enclosure body 220. The body has two parallel walls 230 and 232 which extend from a base 234. A forward bulkhead 236 also extends normally from the flat base 234 and is integral with the walls 230 and 232. The base 234 has an opening 238 adjacent to the forward bulkhead 236, and a rib 240 extends from the opening 238 parallel to the walls 230 and 232. The rib 240 has two flat surfaces 242 and 244 which intersect centrally of the rib along a straight line 246. The forward end 248 of the rib 240 terminates at the opening 238 in a straight edge perpendicular to the walls 230 and 232. The rearward end 250 of the rib 240 also terminates in a straight edge perpendicular to the walls 230 and 232, and the end 250 of the rib 240 is spaced from a bar 252 extending from the inner surface of the base 234 and disposed perpendicular to the walls 230 and 232. In this manner, a recess 254 is formed on the inner surface of the base 234 between the parallel walls formed by the end 250 of the rib 240 and the bar 252.

Figure 27:
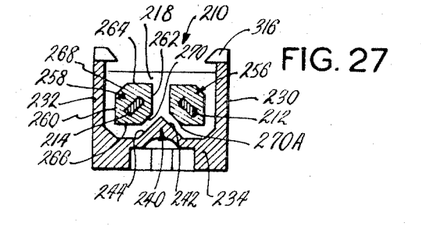
FIGURE 27 is a sectional view taken along the line 27—27 of FIGURE 18.

The generating element assembly 210 has a quadrangular backpad 218 with a length approximately equal to the distance between the walls 230 and 232 and a thickness approximately equal to the distance between the bar 252 and the end 250 of the rib 240. The backpad 218 is snugly disposed within the enclosure body between the end 250 of the rib 240 and bar 252, and extends from the surface of the recess 254 to abutment with the cover 222, as will be hereinafter described. FIGURES 14, 18, and 27 best illustrate the position of the backpad 218 in the enclosure body 220.

The generating element assembly 210 has an elongated sleeve 256 which extends from the backpad 218 encompassing the generating element 212 toward the yoke 216. In like manner, a second sleeve 258 extends from the backpad encompassing the generating element 214. The sleeves 256 and 258 are integral with the backpad 218 and function as damping members in the acoustical system for the generating elements 212 and 214. It is to be noted from FIGURES 20 and 27 that the sleeves 256 and 258 have a generally rectangular cross-section with flat surfaces 260 and 262 parallel to the walls 230 and 232 and flat surfaces 264 and 266 parallel to the base 234. The diangonally opposite corners of the sleeves 256 and 258, however, are provided with surfaces 268 and 270 which are parallel to the flat surfaces of the rib 240, these surfaces being designated 242 and 244. FIGURE 27 illustrates that the flat surface 270 of the sleeve 258 is spaced from the surface 244 of the rib 240, and that the rib 256 is mirror image of the rib 258 with its corresponding surface 270A parallel to and spaced from the surface 242 of the rib 240. In operation, the sleeves 256 and 258 function to damp out undesired resonances in much the same manner as the construction shown in Patent No. 3,060,280 of Wood entitled Electromechanical Transducer.

FIGURE 21 illustrates the construction of the generating elements 212 and 214. Each of these elements is formed by a pair of flat slabs 272 and 274 which are assembled together by a thin layer 276 of electrically conducting material. Electrically conducting electrodes 278 and 280 are mounted on opposite sides of the slabs 272 and 274 from the central interconnecting layer 276. The slabs 272 and 274 are of piezoelectric material, such as polarized barium titinate or lead zirconium titinate. The slabs 272 and 274 are polarized in opposite directions relative to the central conducting layers 276 so that bending of the elements about an axis perpendicular to the axis of elongation of the elements and parallel to the electrodes 276, 278 and 280 generates voltages of opposite potential on the electrodes 278 and 280.

The ends of the elements 212 and 214 remote from the backpad 218 are mounted in an affixed yoke 216, as illustrated in FIGURES 13, 18, 19, and 21. The yoke 216 is also constructed of compliant material and has a central portion 282 from which two straight arms 284 and 286 extend outwardly perpendicular to each other. The arms 284 and 286 terminate at their ends remote from the central portion 282 in a hub 288 and 290 respectively, and the hubs 288 and 290 extend inwardly from the ends of the arm and are provided with central apertures 292 and 294 which accommodate the ends of the elements 212 and 214, respectively, and are secured thereon. The central portion 282 of the yoke 216 extends from the arms 284 and 286 in a Y-configuration, and the central portion 282 extends through the opening 238 in the base 234 of the enclosure body 220. A V-shaped recess 296 extends in the end of the central portion 282 remote from the arms 284 and 286 and engages the drive arm of the stylus assembly 228, as will be hereinafter more fully described.

As best illustrated in FIGURE 18, the enclosure body 220 is provided with a lip 98 which extends backwardly from the forward bulkhead 236. The cover 222 is provided with a thin quadrangular portion 300 which has a width approximately equal to the distance between the walls 230 and 232 of the enclosure body 220 and is slidably disposed between the walls 230 and 232. The quadrangular portion 300 is provided with a forwardly extending flange 302 which is accommodated within the enclosure body 220 immediately confronting the lip 298 when the cover 222 is positioned on the enclosure body 220 to complete the casing 224. The quadrangular portion 300 has a flat surface 304 which is disposed parallel to the base 234 and which abuts the surface of the backpad 218 opposite the recess 254 to firmly wedge the backpad 218 within the casing 224. The cover 222 is provided with outwardly extending shoulders 306 on opposite sides of the central axis of the cover which confront and accommodate the upper edges of the walls 230 and 232, and each of the shoulders 306 has a recess 308 extending therein in the plane of the walls 230 and 232. The recesses 308 accommodate outwardly extending keys 310 on the walls 230 and 232 which prevent the cover 222 from being translated along its axis when in position on the enclosure body 220.

Each of the shoulders 306 of the cover 222 is provided with an indentation 312 on the end of the cover opposite the flange 302. Each of the indentations 312 has a flat surface 314 which is engaged by an inwardly extending tab 316 protruding upwardly from the end of the walls 230 and 232. Each of the tabs 316 locks the cover 222 on the enclosure body 220 and secures the keys 310 of the walls 230 and 232 in engagement with the recesses 308 in the shoulders 306 of the cover. In this manner, a limited force is exerted on the backpad 218 by the surface 304 of the cover 222 and the surface of the recess 254 of the base 234. Also, as illustrated in FIGURES 15 and 22, a pair of parallel ribs 318 protrude from the flat surface 304 of the quadrangular portion 300 of the cover 222 forming a pair of shoulders 320 which abut the surface of the backpad 218 remote from the yoke 216, this surface being designated 322, and prevent the backpad 218 from being tilted against the bar 252 by a record force impressed on the yoke 216 in a direction toward the lip 298. It will be noted that it is not necessary to cement the backpad 218 within the casing 224, but merely to place the backpad in a proper position within the enclosure body 220 and snap the cover 222 in position by first inserting the flange 302 beneath the lip 298 and then exerting a downward pressure to force the tabs 316 to engage the flat surfaces 314 of the indentations 312 on the cover 222. A slot 324 is disposed in each of the walls 230 and 232 of the enclosure body parallel to the rear end 336 of the walls and forward of the tabs 316 in order to provide resilience to permit the tabs 316 to be displaced outwardly to receive the cover 222.

The cover 222 is also provided with a pair of mounting flanges 328 and 330 which are disposed in a common plane and extend outwardly relative to the axis of elongation of the casing 224. The plane of the flanges 328 and 330 is disposed at an angle to the axis of elongation of the casing 224 in order to properly orient the stylus relative to the record player conventionally employed, as will be more clearly apparent hereinafter. Each of the mounting flanges has a circular indentation 332 at its end for receiving a mounting screw in the conventional manner.

FIGURES 15, 16, 28, and 29 illustrate the clamp 226 which is used to maintain the stylus assembly 228 in position. The clamp 226 is constructed of resilient spring metal, and has a central elongated strip 334 which is provided with a bend at its one end forming a part cylindrical portion 336 with a central axis normal to the axis of elongation of the strip 334. The strip is also provided with two bends 338 and 340 near the center of the axis of elongation, and the bends 338 and 340 are normal to the axis of elongation and less than a right angle. The bend 340 is through a slightly greater angle than the bend 338 so that the part cylindrical portion 336 is spring biased downwardly relative to the flat end portion, designated 342, at the opposite end of the clamp 226.

Figures 28, 30, 31:
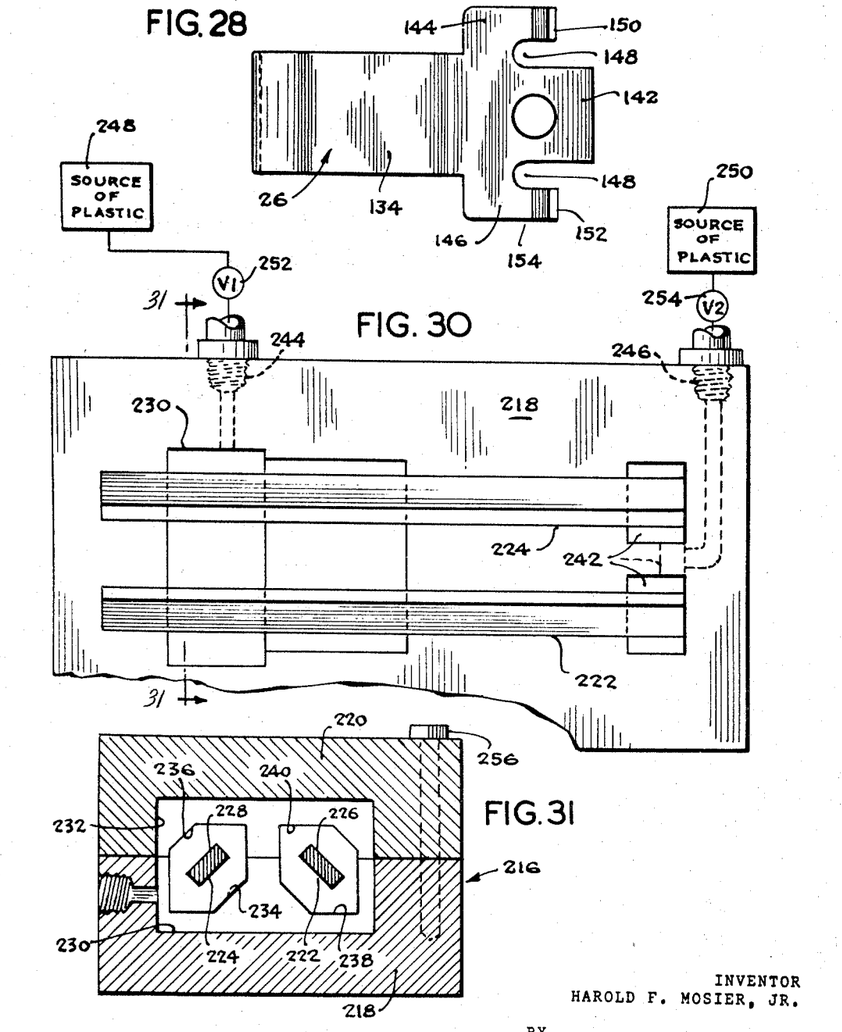
FIGURE 28 is a bottom view of a clamp for mounting the stylus assembly on the casing of the phonograph pickup of FIGURES 13 through 27.
FIGURE 30 is a plan view of a mold for simultaneously molding and mounting the backpad and yoke on the piezoelectric elements of the phonograph pickup of FIGURES 13 through 29, the elements being shown in position and the figure being partly diagrammatic.
FIGURE 31 is a sectional view taken along the line 31—31 of FIGURE 30.
Figure 29:
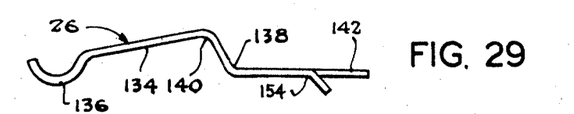
FIGURE 29 is a side elevational view of the clamp of FIGURE 28.

The clamp 226 has a pair of flat tabs 334 and 346 disposed in the plane at the end portion 342 and extending outwardly from the axis of elongation of the clamp 226. The tabs 344 and 346 are provided with slots 348 parallel to the axis of elongation of the clamp 226 which provide a pair of fingers 350 and 352 which extend from the tabs 344 and 346 toward the end opposite the part cylindrical portion 336. The fingers 350 and 352 are provided with bends 354 in an opposite direction from the bend of the part cylindrical portion 336 and through an angle of approximately 45°.

The base 234 of the enclosure body 220 is provided with a pair of protruding parallel ribs 356 and 358 adjacent to the walls 230 and 232, respectively. The ribs 356 and 358 are inter-connected by a crossbar 360, the length of the crossbar being slightly geater than the width of the central strip 334 of the clamp 226. Also, each of the ribs 346 and 358 has a slot 362 extending therein parallel to the plane of the base 234, and the slots 362 are adapted to receive the tabs 344 and 346 of the clamp 226. A recess 364 extends into the base 234 immediately adjacent to each of the slots 362 and is provided with a flat surface 366 between the slot 362 and the rear end 337 of the enclosure body 220. The clamp 226 is mounted on the enclosure body by inserting the tabs 344 into the slots 362, thereby positioning the fingers 350 and 352 in the recesses 364 in engagement with the surfaces 366, thereby retaining the clamp 226 in position. The strip 334 of the clamp 226 extends over the crossbar 360, and the part cylindrical portion 336 of the clamp 226 is spring biased into abutment with the surface of the base 234.

FIGURE 16 illustrates the stylus assembly 228. The stylus assembly 228 has a stylus drive arm 368 which carries at its end a pair of styli 370 on opposite sides of the arm 368. The arm 368 is positioned in the V-shaped recess 296 of the yoke 216 exterior of the casing 224. The arm 368 is disposed parallel to the central axis of the casing 224 and is coupled to a mounting stub 372 by means of a sleeve 374 of compliant material which has a cylindrical contour of substantially greater diameter than the drive arm 368. The end of the stub 372 opposite the sleeve 374 is generally cylindrical and disposed between the part cylindrical portion 336 of the clamp 226 and the confronting surface of the base 234 of the enclosure body 220, thereby securing the stub 372 onto the casing 224. The stub has an outwardly extending arm 378 permitting rotation of the drive arm 368 to position a different stylus 370 in confrontation with a record, and a stop lug 380 protrudes from the cylindrical portion of the stub 372 in the plane of the arm 378 to maintain the rotational position of the drive arm 368 by abutment with the clamp 226. A pair of ribs 382 and 384 protrude from the surface of the base 234 on opposite sides of the stub 372 to maintain the drive arm 368 parallel to the axis of elongation of the casing 224, and a part cylindrical recess 386 formed in the surface of the base 234 accommodates the compliant sleeve 374 in abutment with the casing 224.

Figure 25:
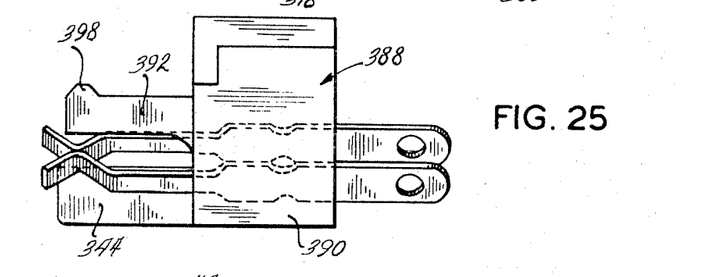
FIGURE 25 is a side elevational view of an end connector for the phonograph pickup cartridge illustrated in FIGURES 13 through 24.
Figure 26:
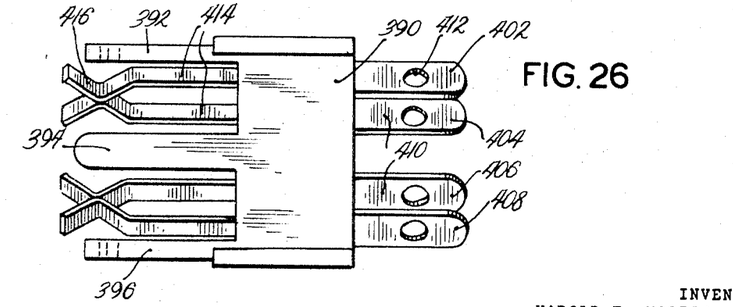
FIGURE 26 is a plan view of the connector plug of FIGURE 13.

It will be noted that the generating elements 212 and 214 extend through the backpad 218 and protrude from the opposite side of the backpad from the yoke 216. The electrodes 278 and 280 on the opposite surfaces of the generating elements 212 and 214 also extend through to the ends of these elements opposite the yoke 216, and therefore the electrodes 278 and 280 of the generating elements 212 and 214 are directly accessible from the end of the casing 336. FIGURES 25 and 26 illustrate a connector which fits within the end 336 of the casing 224 and directly engages the electrodes on the generating elements 212 and 214.

It will be noted from FIGURES 15 and 22, that the walls 230 and 232, base 234, and cover 222 provide a generally rectangular opening at the rear end 337 of the casing 224. A male plug 388 is accommodated by this recess, and the plug 388 is illustrated in FIGURES 25 and 26. The plug has a hub 390 which is disposed exterior of the casing 224, and three protruding parallel strips 392, 394, and 396 extend from one side of the hub 390. The central strip of these three, designated 394 is slidably disposed between the ribs 318 disposed on the interior surface of the cover 222 which serve as a guideway for the strip 394. The other two strips 392 and 396 extend into the casing 226 adjacent to the walls 230 and 232 and adjacent to the base 234. Each of these strips has a protrusion 398 adjacent to the end thereof opposite the hub 390 extending away from the strip 394, and each of the protrusions 398 mates with a recess 400 in the inner surface of the base 234 (FIGURES 17 and 18) to anchor the plug 388 onto the casing 224.

Four parallel electrically connecting terminal strips 402, 404, 406, and 408 extend through the hub 390. The portion 410 of each of the strips extending from the side of the hub 390 opposite the strips 392, 394 and 396 is provided with an aperture 412 for receiving an electrical connector and is adapted to be soldered on the connector. The portions 414 of each of the strips extending from the other side of the hub 390 are provided with oppositely directed confronting bends 416 which abutting when the plug 388 is exterior of the casing 224. When the plug is inserted into the recess in the end 337 of the casing 224, the terminal strips 402 and 404 engage the electrodes 278 and 280, respectively of the generating element 214 which protrude from the backpad 218, and the terminal strips 406 and 408 engage the electrodes 280 and 278, respectively of the generating element 212. It is to be noted that the plug 388 makes direct contact with the electrodes on the generating elements and no separate connector is provided between these electrodes and the terminals of the plug.

Figure 1:
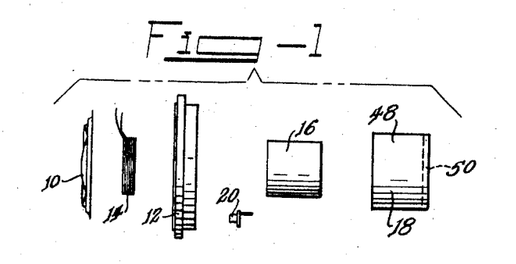
FIGURE 1 is an exploded view of a microphone structure constructed according to the teachings of the present invention and illustrated in FIGURES 1 through 5.
Figure 2:
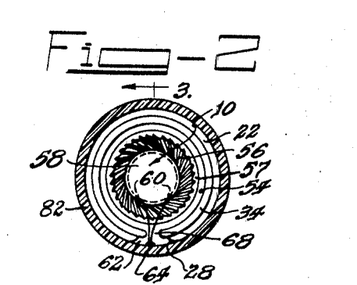
FIGURE 2 is a sectional view of the microphone structure taken along the line 2—2 of FIGURE 3.

The design and construction of a phonograph pickup cartridge according to the present invention greatly facilitates assembly and reduces the amount of hand labor required to construct a stereophonic phonograph pickup. The generating element assembly 210 is preferably fabricated in a single molding operation, as will be hereinafter described, and the enclosure body 220 and cover 222 of the casing are also provided in a single molding operation. As illustrated in FIGURE 1, the generating element assembly 210 may simply be placed in position within the enclosure body 220 in the first step of assembly. In a second assembly step, the cover 222 may simply be positioned on the enclosure body by inserting the flange 302 of the cover 222 beneath the lip 298 of the enclosure body and forcing the cover 222 downwardly to engage the tabs 316. The third step in assembling the cartridge is illustrated in FIGURE 15, and requires the clamp 226 to be inserted into the slots 362 so that the fingers 350 and 352 will engage the recesses 364 and secure the clamp 226 in position. The fourth and final step in the final assembly of the cartridge is to insert the stub 372 of the stylus assembly 228 beneath the part cylindrical portion 336 of the clamp 226 and secure the stylus assembly 228 onto the casing in this manner.

FIGURES 30 and 31 illustrate the manner in which the generating element assembly 210 is fabricated by a molding process. In these figures, a mold 416 is illustrated having a base 418 and a top portion 420. The base 418 is provided with a pair of parallel recesses 422 and 424 extending therein from the surface thereof. The recesses 422 and 424 constitute a portion of a quadrangular recess and are aligned with the remaining portions 426 and 428 of the quadrangular recess which are disposed in the top portion 420 of the mold 416. The combined recesses 422 and 426 form a single cavity having the cross section and length of the generating element 212, and the combined recesses 424 and 428 form a single cavity having the cross section and length of the generating element 214. It is to be noted that the cavity formed by the recesses 422 and 426 has a width axis which is perpendicular to the width axis of the cavity formed by the recesses 424 and 428. Hence, the cavities thus formed receive the generating elements 212 and 214 and mount them with their width axes perpendicular to each other, in the manner required of the generating element assembly.

The recesses 422 and 424 in the base 418 of the mold 416 are interconnected by a rectangular recess 430 which mates with a rectangular recess 432 in the top portion 420 of the mold to form the contour of the backpad 218. In like manner, the base 418 and top portion 420 are provided with recesses forming the contour of the sleeve 256 which are designated 434 and 436, respectively and which extend from the recesses 430 and 432, respectively. Also, a cavity in the form of the sleeve 258 is formed extending from the recesses 430 and 432 by recesses 438 and 440.

The base 418 is also provided with a Y-shaped recess 442 which encompasses the recesses 422 and 424 at the ends thereof opposite the recess 430. The Y-shaped recess 424 is aligned with mating recesses, not shown, in the top portion 420 of the mold to complete the contour of the yoke 216.

A port 444 is provided in the base 418 communicating with the recess 430, and a second port 446 is provided in the base 418 communicating with the interconnecting portion of the Y-shaped recess 442. These ports are connected to a source of molten plastic for injection molding, and as illustrated in FIGURE 30, separate sources 448 and 450 are connected through separate valves 452 and 454, respectively, to the ports 444 and 446. In this manner, a different plastic may be utilized to form the backpad 218 and the sleeves 256 and 258 form that utilized to form the yoke 216. It is to be understood however that a single source of molten plastic may be utilized through a single valve to form both the backpad 218 and the yoke 216. It is preferable under most constructions to provide a more compliant plastic for the yoke 216 than for the backpad 218, and that may be accomplished by the use of separate sources of molten plastic 448 and 450.

The generating element assembly may be formed utilizing the mold 416 by first positioning the generating elements 212 and 214 in the base 418 of the mold, and thereafter securing the top portion 420 of the mold in position by tightening bolts illustrated at 456. Thereafter, the valves 452 and 454 may be opened to injection mold both the backpad 218 with its associated sleeves 256 and 258 and the yoke 216. The completed assembly may then be removed from the mold 416.

Those skilled in the art will readily devise many modifications of the present invention as here disclosed, and further will find many applications for the present invention over and above those here disclosed. It is therefore intended that the scope of the present invention be not limited by the foregoing disclosure, but rather only by the appended claims.

The invention claimed is:

1. The method of making an assembly of a first and a second electroacoustical circuit element spaced by a fixed distance and positioned in a fixed relationship relative to each other for use in a transducer comprising the steps of placing a first circuit element into a cavity of a mold with a first portion of said first circuit element in abutment with a portion of the mold to hold said element in a fixed position and a second portion of said first circuit element disposed within the cavity of the mold and spaced from the surfaces of the cavity of the mold, said first circuit element being spaced by the fixed distance from a protrusion extending into the cavity of the mold having the contour of the second circuit element and said first circuit element being positioned in the fixed relationship relative to said protrusion, injecting a mass of plastic material having a relatively high impedance to the flow associated with the circuit elements in liquid phase into the mold, cooling said mass of plastic material to a solid structure, and removing said first circuit element and solid structure as a unit from the mold, whereby the protrusion forms a socket for engaging the second circuit element displaced from the first circuit element by the fixed distance and oriented in the fixed relationship relative to the first circuit element.

2. The method of making an assembly of a first and a second electroacoustical circuit element spaced by a fixed distance and positioned in a fixed relationship relative to each other for use in a transducer comprising the steps of claim 1 in combination with the step of thereafter inserting the second circuit element in the socket of the solid structure.

3. The method of making an assembly of a first and a second electroacoustical circuit element spaced by a fixed distance and positioned in a fixed relationship relative to each other for use in a transducer comprising the steps of placing a first circuit element into a cavity of a mold with a first portion of said first circuit element in abutment with a portion of the mold to hold said element in a fixed position and a second portion of said first circuit element disposed within the cavity of the mold and spaced from the surface of the cavity of the mold, placing the second circuit element into the cavity of the mold spaced from the first circuit element by the fixed distance, said second circuit element extending into the cavity from the mold and being positioned in the fixed relationship relative to the first circuit element, injecting a mass of plastic material having a relatively high impedance to the flow associated with the circuit elements in liquid phase into the mold, cooling said mass of plastic material to a solid structure, and removing said first circuit element, second circuit element and solid structure as a unit from the mold.

4. The method of making an assembly of a first and a second magnetic circuit element spaced by a magnetic gap of fixed distance comprising the steps of claim 3 wherein the first circuit element is of ferromagnetic material and the second circuit element is of ferromagnetic material, and the mass of plastic material is nonmagnetic.

5. The method of making an assembly of a first and a second electroacoustical circuit element spaced by a fixed distance and positioned in a fixed relationship relative to each other for use in a transducer comprising the steps of claim 4 in combination with the step of mounting a diaphragm and voice coil assembly on one of the magnetic circuit elements with the voice coil translatably disposed in the magnetic gap.

6. The method of making an assembly of a first and a second piezoelectric circuit element spaced by a fixed distance and positioned in a fixed relationship relative to each other for use in a transducer comprising the steps of claim 3 wherein the first circuit element in the form of an elongated piezoelectric generating element and the second circuit element in the form of a second elongated piezoelectric generating element are placed in the mold, and the plastic material is electrically nonconducting.

7. The method of making a sub-assembly for a stereophonic phonograph pickup comprising a yoke having a pair of legs and an intermediate common portion, a backpad, and a pair of elongated quadrangular piezoelectric elements, each of the elements having a first portion mounted on the backpad and a second portion spaced from the first portion mounted on the yoke, each of said elements having a pair of electrodes on a pair of opposite surfaces parallel to the axis of elongation of the element and generating potentials of opposite sign on said electrodes responsive to a force exerted on the element tending to bend the element about an axis normal to the axis of elongation of the element and parallel to the electrodes on the element, comprising the steps of mounting the two elements in a fixed position relative to each other on opposite sides of a common axis with the ends of the elements disposed on two planes normal to the common axis, thereafter positioning means about the elements defining a substantially liquid tight first cavity encompassing the first portion of both of the piezoelectric elements and having the contour of the backpad, injecting a mass of liquid material which solidifies at room temperature and at room temperature has approximately the compliance of vinyl plastic, positioning means defining a substantially liquid tight second cavity spaced from the first cavity and encompassing the second portion of both of the piezoelectric elements, the second cavity having the contour of the yoke, injecting a mass of liquid material which solidifies at room temperature and at room temperature has approximately the compliance of vinyl plastic, and thereafter removing the means defining cavities adjacent to the first and second portions of the elements and releasing the assembly from the mounting means.

8. The method of making a sub-assembly for a stereophonic phonograph pickup comprising a yoke having a pair of legs and an intermediate common portion, a backpad, and a pair of elongated generating elements, each of the elements having a first portion mounted on the backpad and a second portion spaced from the first portion mounted on the yoke, each of said elements having a pair of electrodes on two surfaces thereof adjacent to one end of the element and generating potentials of opposite sign on said electrodes responsive to a force exerted on said element comprising the steps of mounting the two elements in a fixed position relative to each other and generally parallel to a common axis with the ends of the elements disposed on two planes normal to the common axis, thereafter positioning means about the elements defining a substantially liquid tight first cavity encompassing the first portion of both of the piezoelectric elements and having the contour of the backpad, injecting a mass of liquid material which solidifies at room temperature and has substantial compliance at room temperature, positioning means defining a substantially liquid tight second cavity spaced from the first cavity and encompassing the second portion of both of the piezoelectric elements, the second cavity having the contour of the yoke, injecting a mass of liquid material which solidifies at room temperature and has substantial compliance at room temperature, and thereafter removing the means defining cavities adjacent to the first and second portions of the elements and releasing the assembly from the mounting means.

9. The method of making a sub-assembly for a stereophonic phonograph pickup comprising a yoke having a pair of legs and an intermediate common portion, a backpad, and a pair of elongated quadrangular piezoelectric elements, each of the elements having a first portion mounted on the backpad and a second portion spaced from the first portion mounted on the yoke, each of said elements having a pair of electrodes on a pair of opposite surfaces parallel to the axis of elongation of the element and generating potentials of opposite sign on said electrodes responsive to a force exerted on the element tending to bend the element about an axis normal to the axis of elongation of the element and parallel to the electrodes on the element, comprising the steps of mounting the two elements in a fixed position relative to each other and parallel to a common axis with the ends of the elements disposed on two planes normal to the common axis, said elements being mounted with the planes of the electrodes of one element generally normal to the planes of the electrodes of the other element, thereafter positioning means about the elements defining a substantially liquid tight first cavity encompassing the first portion of both of the piezoelectric elements and having the contour of the backpad, injecting a first mass of liquid material which solidifies at room temperature and at room temperature has approximately the compliance of vinyl plastic, positioning means defining a substantially liquid tight second cavity spaced from the first cavity and encompassing the second portion of both the piezoelectric elements, the second cavity having the contour of the yoke, injecting a second mass of liquid material which solidifies at room temperature and at room temperature has greater compliance than the first material, and thereafter removing the means defining cavities adjacent to the first and second portions of the elements and releasing the assembly from the mounting means.

10. The method of making an electroacoustical device comprising the steps of simultaneously molding a circular ring on one surface of a ferromagnetic plate coaxially about a circular opening in said plate and a mounting structure for a ferromagnetic member on the opposite surface of said plate, said support structure having an orifice aligned with the opening of the plate, positioning a ferromagnetic member in the support structure having a cylindrical portion of smaller diameter than the opening of the plate disposed within the orifice of the support structure to form with the plate a circular gap, mounting a cylindrical coil adapted to be disposed in said gap on a flexible diaphragm having a peripheral portion disposed on a plane displaced from the central portion of the diaphragm, trimming the peripheral portion of the diaphragm to a circular form coaxial with the coil and having a diameter of the inner surface of the circular ring, and securing the diaphragm on the plate within the ring, thereby positioning the coil within the gap.

11. The method of making a subassembly for an electroacoustical device comprising the steps of placing horizontally a ferromagnetic plate having a cylindrical opening on the lower part of a two part cavity mold, the lower part of the mold having a cylindrical sleeve extending upwardly from a base and extending through the opening of the plate, positioning a hollow cylindrical ferromagnetic pole piece of smaller diameter than the inner diameter of the sleeve within the sleeve, said pole piece being disposed about a cylindrical boss of the mold extending upwardly from the lower part of the mold coaxial with the sleeve of the lower part of the mold, positioning a ring magnet about the pole piece in abutment with the plate, positioning a second ferromagnetic plate in abutment with the side of the ring magnet opposite the first plate, said second plate also abutting the end of the pole piece opposite the lower part of the mold and having a plurality of apertures therethrough disposed in a circle coaxial about the boss and extending to a circle having a diameter equal to the inner diameter of the ring magnet, sealing the upper part of the mold on the lower part of the mold, the upper part having pins extending through the apertures of the second plate, and injecting a nonmagnetic plastic into the mold.

12. The method of assembling an electroacoustical device having a magnetic structure with a flat ferromagnetic plate provided with a cylindrical opening and a cylindrical pole piece of smaller diameter mounted coaxially within the cylindrical opening forming a circular gap, and a diaphragm having a flat peripheral portion mounted on a circular flange portion extending away from the plane of the flat peripheral portion, said diaphragm having a circular central portion mounted on the flange portion by a circular fluted portion and carrying a cylindrical coil on the circular portion thereof adapted to be translatably disposed in the gap of the magnetic structure, comprising the steps of positioning a protruding rim on the flat magnetic plate of the ferromagnetic structure extending about the opening in said plate, trimming the peripheral portion of the diaphragm to position the coil of the diaphragm at the same distance from all portions of the perimeter thereof as the rim is positioned from the cylindrical opening in the plate, the periphery of the diaphragm having the same shape and dimensions as the interior surface of the rim, and cementing the flat peripheral portion of the diaphragm to the plate, the diaphragm being disposed within the rim and mating therewith to center the coil in the gap.

13. The method of assembling an electroacoustical device comprising the steps of claim 11 wherein the rim is molded on the plate.

14. The method of assembling an electroacoustical device comprising the steps of claim 11 wherein the step of positioning the rim comprises positioning a circular rim concentrically of the cylindrical opening.

References Cited

UNITED STATES PATENTS

| | | | |
|---|---|---|---|
| 2,511,624 | 6/1950 | d'Halloy | 264—272 X |
| 2,650,953 | 9/1953 | Gunter | 29—594 X |
| 2,749,393 | 6/1956 | Fuchs | 264—272 X |
| 2,957,954 | 10/1960 | Swinehart | 181—31 X |
| 2,984,712 | 5/1961 | Fabel et al. | 181—31 X |
| 3,150,441 | 9/1964 | Kloss | 29—594 X |
| 3,222,754 | 12/1965 | Homan | 264—272 X |
| 3,258,543 | 6/1966 | Mosier | 179—115.5 |
| 3,187,833 | 6/1965 | Flygstad | 181—31 |
| 3,342,953 | 9/1967 | Pless | 179—115.5 |

JOHN F. CAMPBELL, Primary Examiner.

D. C. REILEY, Assistant Examiner.

U.S. Cl. X.R.

29—606; 179—115.5; 181—31; 264—272